(12) United States Patent
Ishii et al.

(10) Patent No.: US 11,328,189 B2
(45) Date of Patent: May 10, 2022

(54) INFORMATION PROCESSING APPARATUS TO DETERMINE A TYPE OF A RECORDING MEDIUM

(71) Applicant: CANON KABUSHIKI KAISHA, Tokyo (JP)

(72) Inventors: Ayuko Ishii, Kanagawa (JP); Hiroaki Ono, Kanagawa (JP); Ryosuke Uemura, Kanagawa (JP); Ryutaro Kitagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/177,836

(22) Filed: Feb. 17, 2021

(65) Prior Publication Data

US 2021/0256329 A1    Aug. 19, 2021

(30) Foreign Application Priority Data

Feb. 19, 2020   (JP) .............................. JP2020-026533

(51) Int. Cl.
| | |
|---|---|
| *G06K 15/02* | (2006.01) |
| *G06K 15/16* | (2006.01) |
| *G06K 15/10* | (2006.01) |
| *G06K 15/00* | (2006.01) |

(52) U.S. Cl.
CPC ......... *G06K 15/021* (2013.01); *G06K 15/102* (2013.01); *G06K 15/16* (2013.01); *G06K 15/4065* (2013.01)

(58) Field of Classification Search
None
See application file for complete search history.

(56) References Cited

U.S. PATENT DOCUMENTS

| 2004/0008244 | A1  | 1/2004 | Tsujimoto | |
| 2012/0002227 | A1* | 1/2012 | Ogino | B41J 11/009 |
| | | | | 358/1.12 |
| 2013/0194622 | A1* | 8/2013 | Low | H04N 1/00015 |
| | | | | 358/1.15 |

FOREIGN PATENT DOCUMENTS

| EP | 3702968 A1 | 9/2020 |
| JP | 2016-215591 A | 12/2016 |

\* cited by examiner

*Primary Examiner* — Andrew H Lam
(74) *Attorney, Agent, or Firm* — Canon U.S.A., Inc. IP Division

(57) ABSTRACT

An information processing apparatus performs acquiring measurement results obtained by measuring a characteristic of a recording medium a plurality of times; inputting information corresponding to a type of the recording medium; acquiring an extraction range of the type indicated by the information, among extraction ranges set to respective types of recording media for determination of a type; setting, based on the measurement results and the type, a parameter for correcting the measurement results to reduce difference between the measurement results and the extraction range; correcting, by using the parameter, measurement results obtained by measuring a characteristic of a recording medium to be recorded; and extracting a candidate type of the recording media, the measurement results, based on the corrected measurement results and the extraction range.

12 Claims, 11 Drawing Sheets

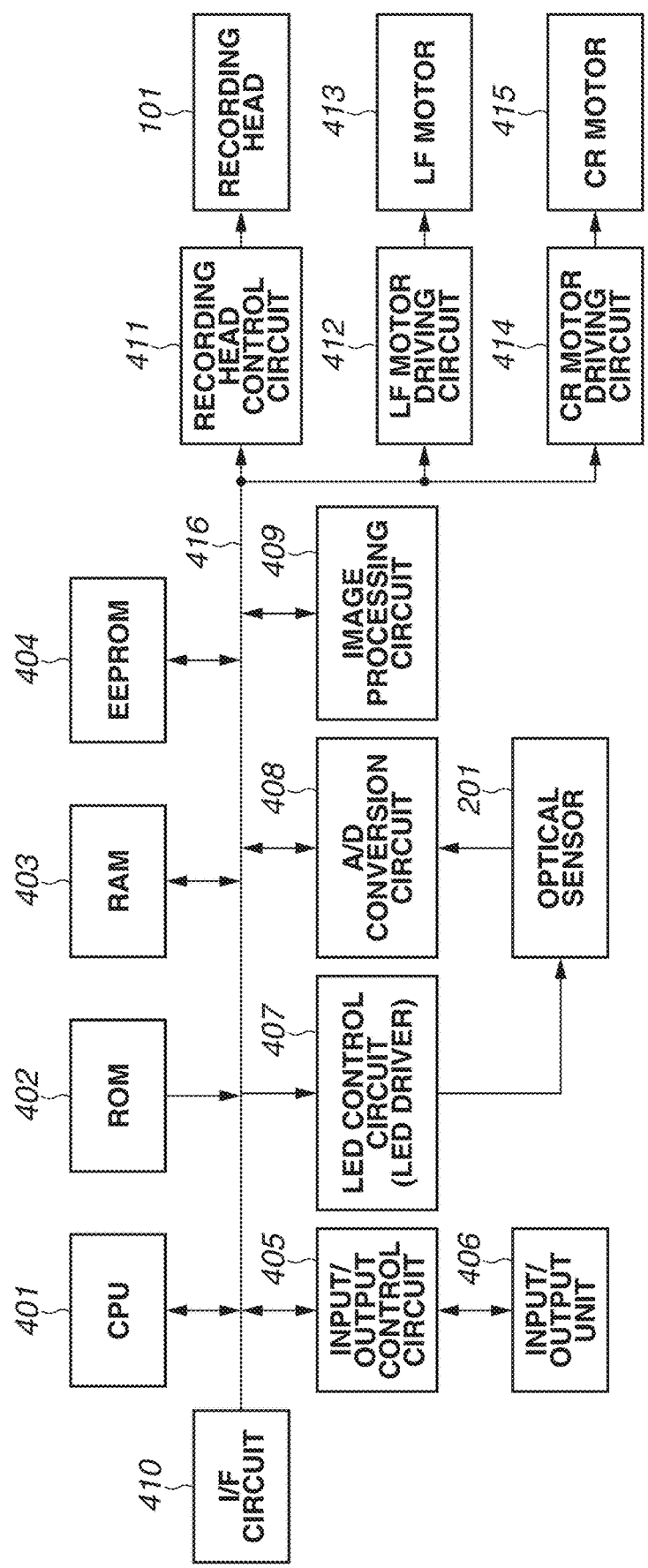

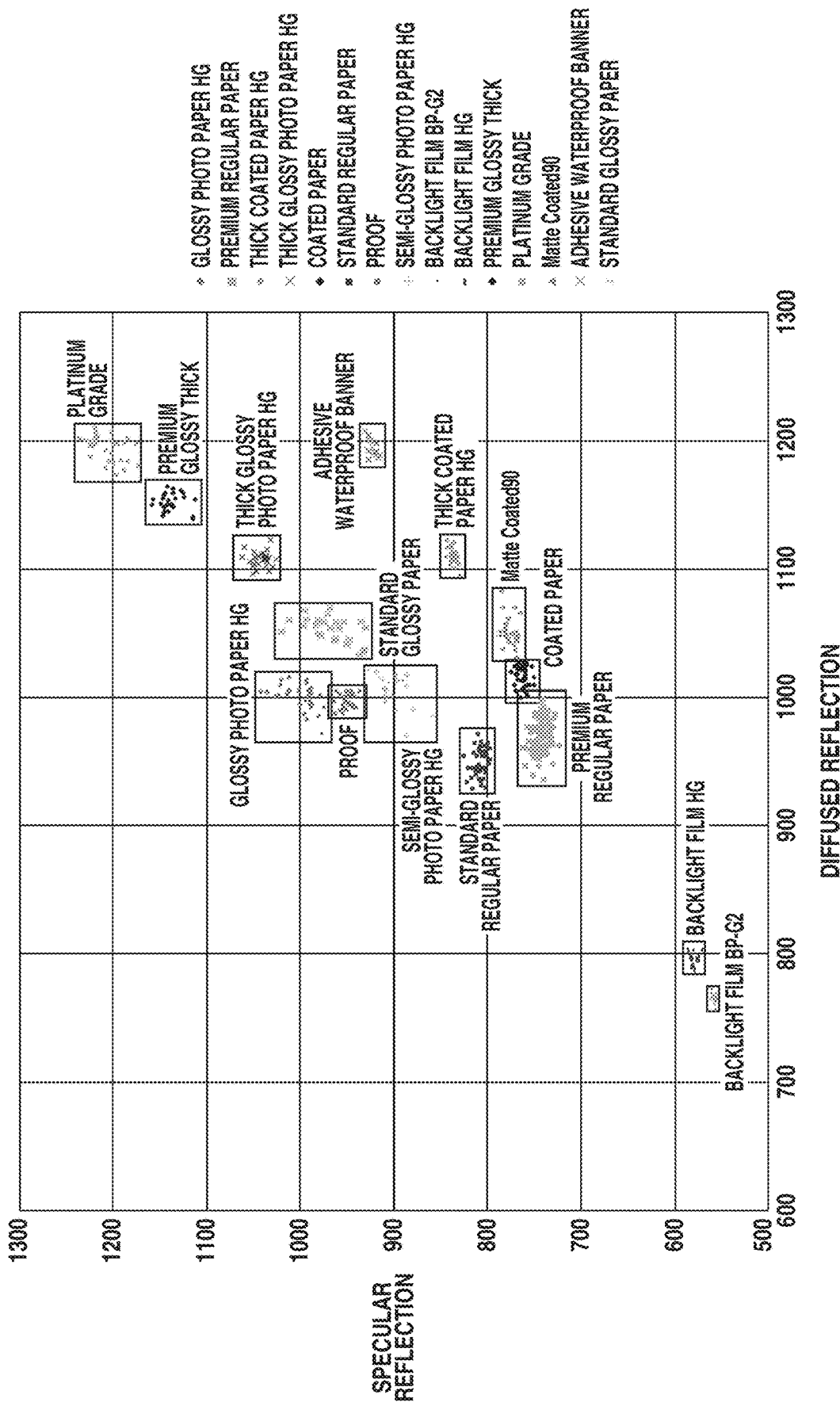

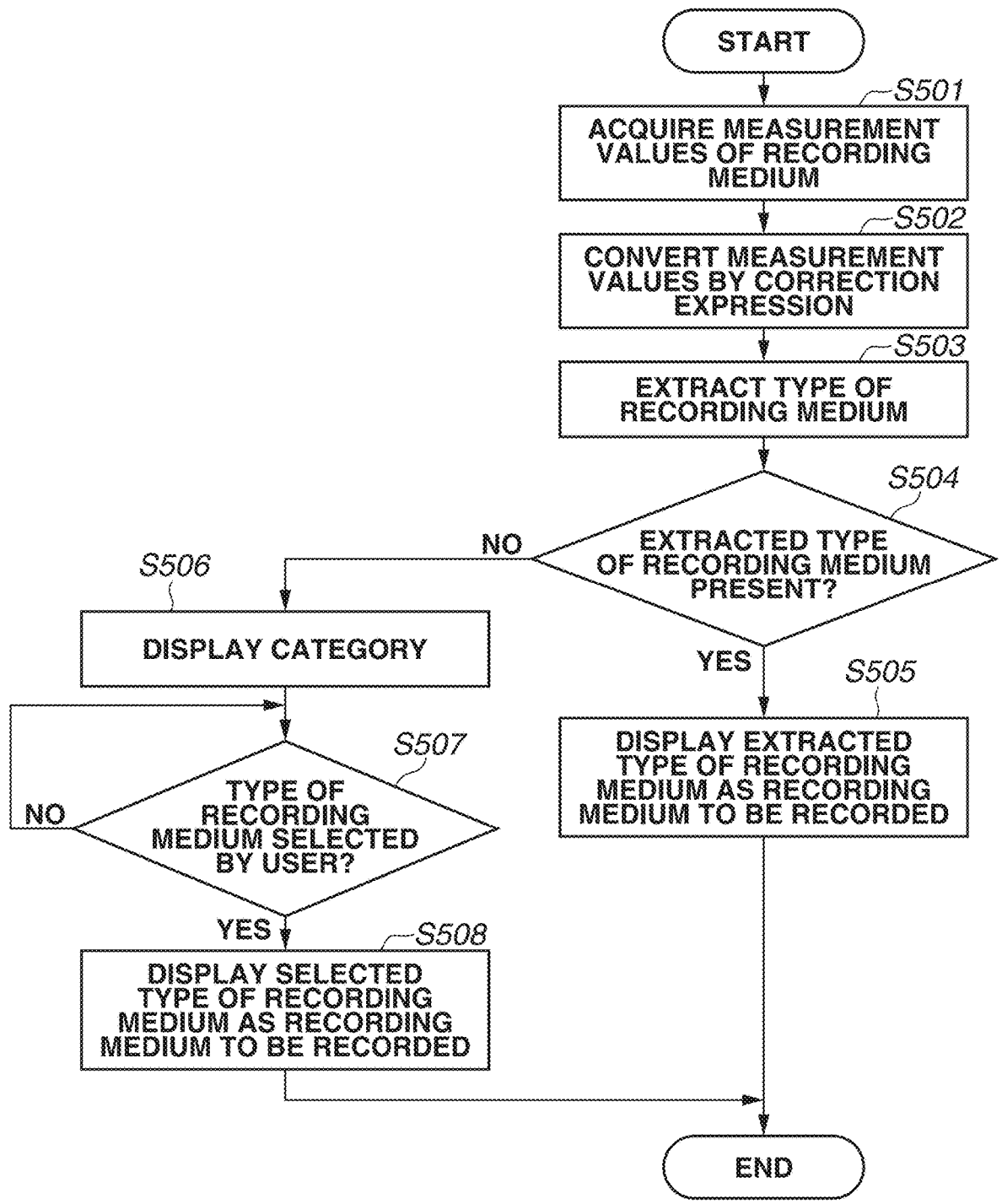

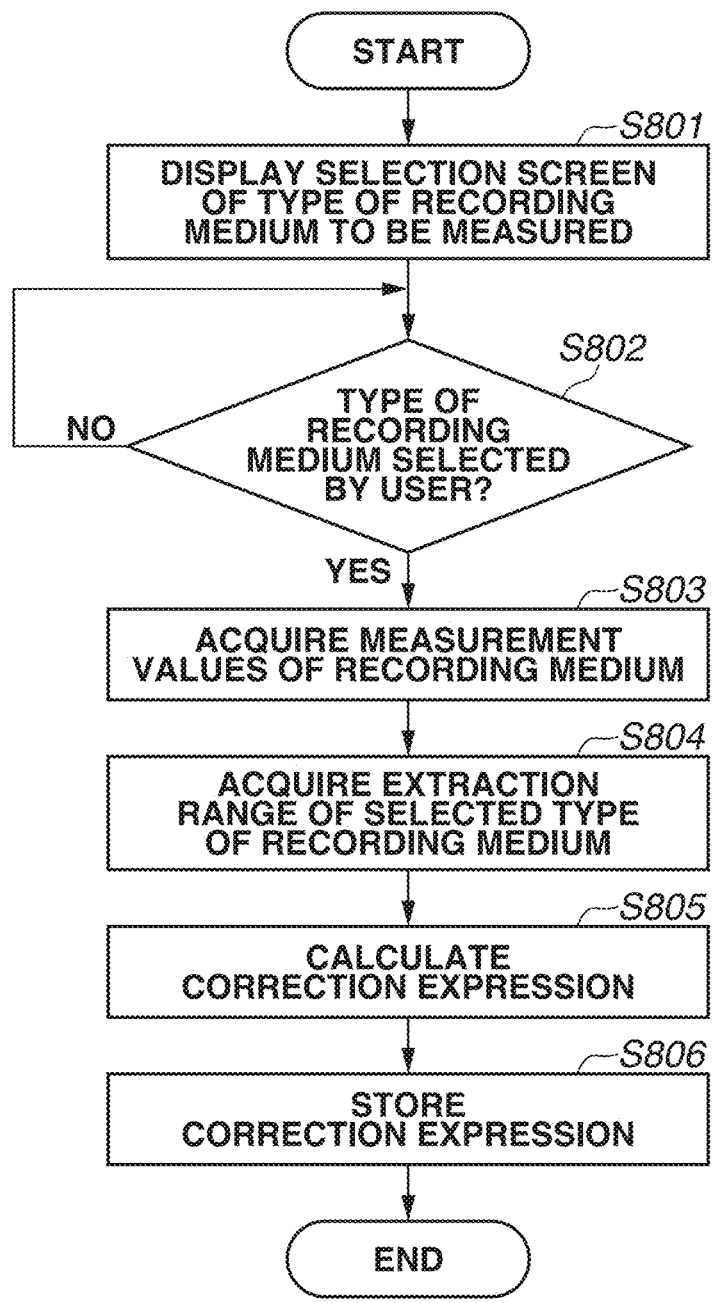

INFORMATION PROCESSING APPARATUS TO DETERMINE A TYPE OF A RECORDING MEDIUM

BACKGROUND OF THE INVENTION

Field of the Invention

The present invention relates to an information processing apparatus and a method of extracting a recording medium.

Description of the Related Art

It is known that a recording apparatus performs recording by using control parameters corresponding to a type of a recording medium. Japanese Patent Laid-Open No. 2016-215591 discusses that, to perform recording by using appropriate control parameters, a plurality of characteristic values of a recording medium to be recorded is measured, and a type of the recording medium is determined by comparing the characteristic values with reference values.

SUMMARY OF THE INVENTION

The present invention provides an information processing apparatus, comprising: an acquisition unit configured to acquire the measurement results obtained by a measurement unit measuring a characteristic of a recording medium set to be measurable by the measurement unit a plurality of times; a storage unit configured to store extraction ranges set to respective types of recording media for determination of a type of a recording medium; an input unit configured to input information corresponding to a type of the recording medium whose the measurement results of which are acquired by the acquisition unit; a setting unit configured to set, based on the plurality of measurement results which is obtained by the measurement unit measuring the characteristic of the recording medium a plurality of times and acquired by the acquisition unit, and the type of the recording medium indicated by the information input by the input unit, a parameter for correcting the measurement results to reduce difference between the measurement results and the extraction range of the type of the recording medium indicated by the information; and an extraction unit configured to correct, by using the parameter, measurement results obtained by the measurement unit measuring a characteristic of a recording medium to be recorded by a recording unit, and to extract a candidate type of the recording medium, the measurement results of which are acquired by the acquisition unit, based on the corrected measurement result and the extraction range.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

FIG. 4 is a diagram illustrating a block configuration of a control system of the recording apparatus according to the first exemplary embodiment.

FIG. 5 is a diagram illustrating an extraction range according to the first exemplary embodiment.

FIG. 6 is a flowchart illustrating recording medium type determination processing according to the first exemplary embodiment.

FIG. 8 is a flowchart illustrating correction expression calculation processing according to the first exemplary embodiment.

DESCRIPTION OF THE EMBODIMENTS

First Exemplary Embodiment

In the technique discussed in Japanese Patent Laid-Open No. 2016-215591, an error of a sensor measuring characteristic values of a recording medium, differences among recording media, different measurement environments, and the like have an influence on the measurement values. Therefore, in a case where previously prepared reference values are used, the type of a recording medium may not be determined with sufficient accuracy.

The present exemplary embodiment is directed to determination of the type of a recording medium with high accuracy.

<Overall Configuration>

Figure 1A:
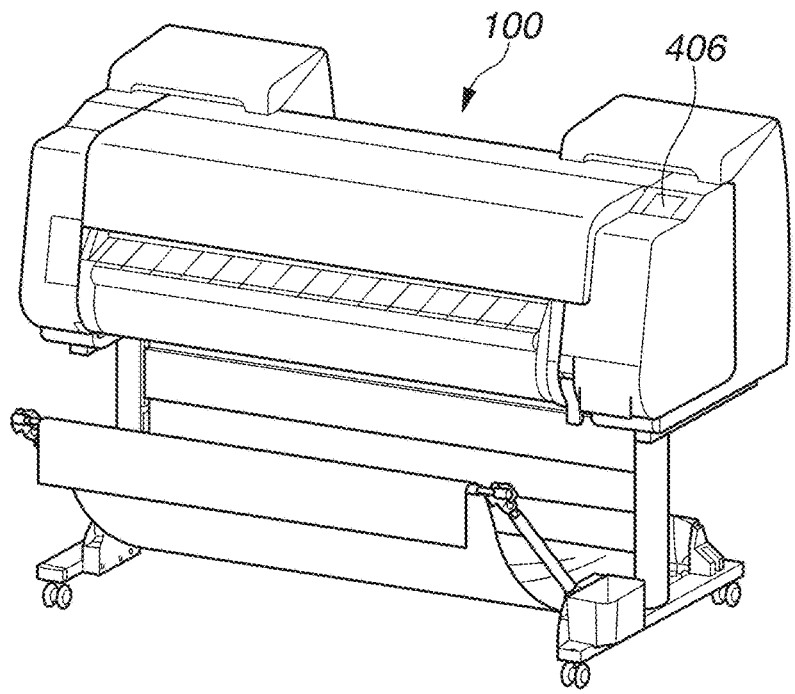
FIG. 1A is a perspective view illustrating a configuration of a recording apparatus according to a first exemplary embodiment.
Figure 1B:
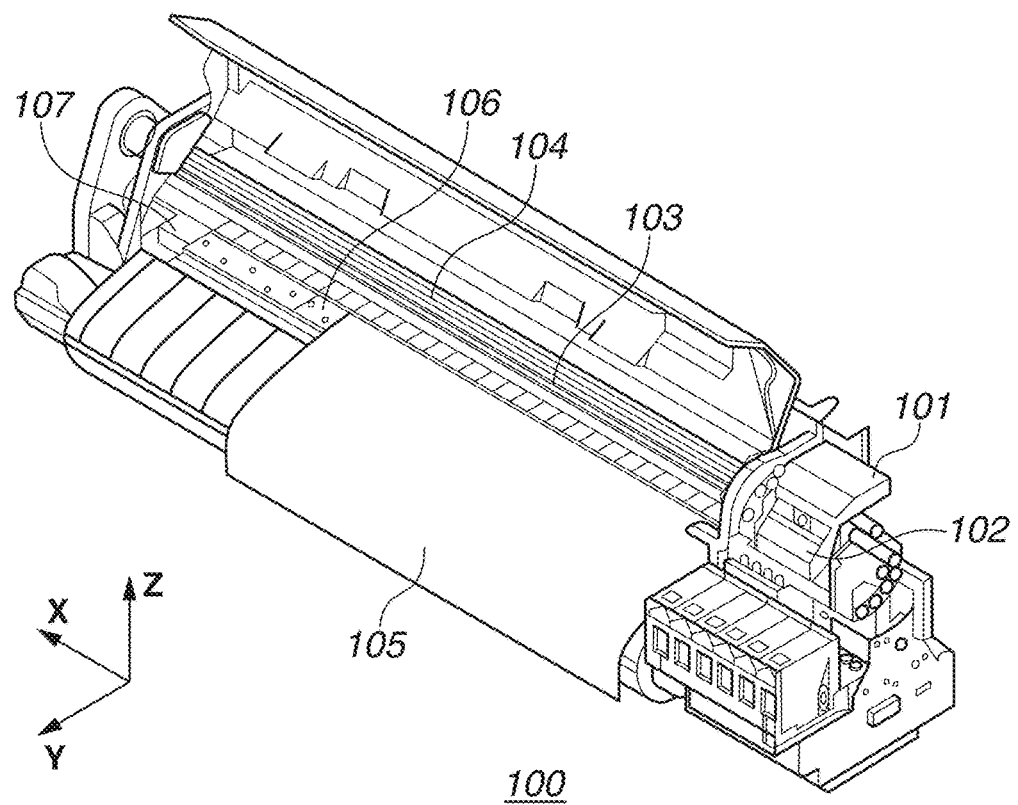
FIG. 1B is a perspective view illustrating the configuration of the recording apparatus according to the first exemplary embodiment.

FIGS. 1A and 1B are perspective views each illustrating a configuration of a recording apparatus 100. The recording apparatus 100 includes a caster and a basket for sheet discharge. FIG. 1A illustrates an entire appearance of the recording apparatus 100, and FIG. 1B illustrates a state where an internal configuration thereof is visible with an upper cover opened. The recording apparatus 100 according to the present exemplary embodiment performs recording by applying ink drops as a recording material to a recording medium, by an inkjet recording method. The recording medium is conveyed in a Y direction as a conveyance direction. A description will be given of an inkjet recording apparatus including a serial type recording head, in which a carriage 101 mounted with a recording head 102 reciprocates in an X direction intersecting with the Y direction, to perform recording. Alternatively, an inkjet recording apparatus including a line type recording head, in which nozzles are arrayed over a recording width in conveyance of the recording medium, may be used. A multifunctional peripheral (MFP), in which not only the recording function but also a scan function, a facsimile (FAX) function, a transmission function and other functions are integrated, may also be used. Further, an electrophotographic recording apparatus using powder toner as the recording material may be used. In the present exemplary embodiment, a function of an information processing apparatus for performing processing to determine a recording medium to be used described below is mounted on the recording apparatus 100.

An input/output unit 406 is provided on an upper part of the recording apparatus 100. The input/output unit 406 is an operation panel, and can display an ink residual amount and a candidate type of a recording medium on a display thereof. The user can select a type of a recording medium and make recording settings by using operating keys.

The carriage 101 includes an optical sensor 201 (FIG. 2), and the recording head 102 including an ejection port surface provided with ejection ports from which ink is ejected. The carriage 101 is configured to reciprocate in the X direction (carriage moving direction) along a shaft 104 via a carriage belt 103 by being driven by a carriage motor (CR motor) 415 (FIG. 4). In the present exemplary embodiment, the recording apparatus 100 can acquire a diffused reflection characteristic value and a specular reflection characteristic value on a surface of a recording medium 105, and can measure a distance between the carriage 101 and the recording medium 105 by the optical sensor 201.

The recording medium 105 such as a roll sheet is conveyed on a platen 106 in the Y direction by a conveyance roller (not illustrated). The recording operation is performed in such a manner that ink drops are ejected from the recording head 102 while the carriage 101 moves in the X direction on the recording medium 105 conveyed on the platen 106 by the conveyance roller. When the carriage 101 moves to an end of a recording area on the recording medium 105, the conveyance roller conveys the recording medium 105 by a certain amount, and moves an area where a next recording scan is performed to a position recordable by the recording head 102. The image is recorded by repeating the above-described operation.

<Carriage Configuration>

Figure 2:
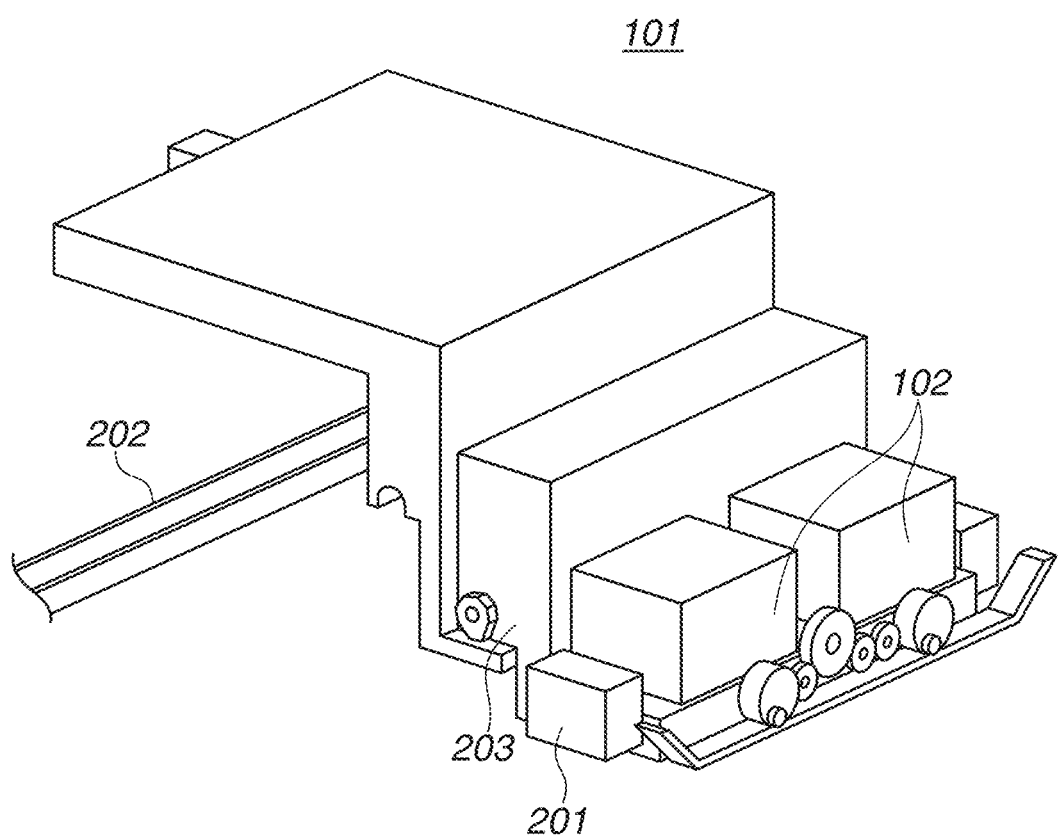
FIG. 2 is a diagram illustrating a configuration of a carriage according to the first exemplary embodiment.

FIG. 2 is a diagram illustrating a configuration of the carriage 101. The carriage 101 includes a translator 202 and a head holder 203. The head holder 203 includes the recording head 102 and the optical sensor 201 as a reflective sensor. As illustrated in FIG. 2, the optical sensor 201 is configured such that a bottom surface thereof is arranged at the position same as or higher than a position of a bottom surface of the recording head 102.

<Optical Sensor Configuration>

Figure 3:
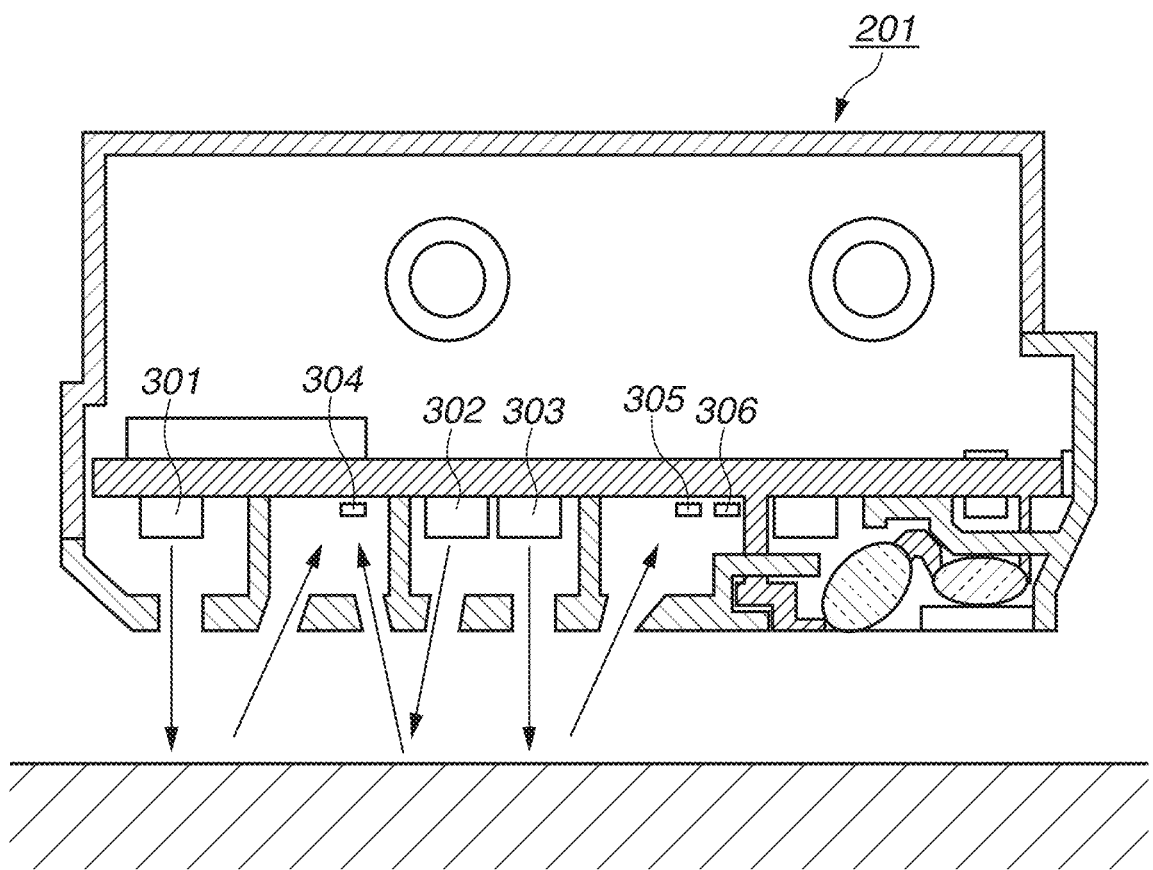
FIG. 3 is a diagram illustrating a configuration of an optical sensor according to the first exemplary embodiment.

FIG. 3 is a schematic cross-sectional view illustrating a configuration of the optical sensor 201. The optical sensor 201 includes, as optical elements, a first light-emitting diode (LED) 301, a second LED 302, a third LED 303, a first photodiode 304, a second photodiode 305, and a third photodiode 306. The first LED 301 is a light source having an irradiation angle of the normal line (90 degrees) to a surface (measurement surface) of the recording medium 105. The first photodiode 304 receives the light that has been emitted from the first LED 301 and reflected by the recording medium 105 at an angle of 45 degrees in a Z direction. In other words, the first photodiode 304 forms an optical system detecting a diffused reflection component of the light reflected from the recording medium 105.

The second LED 302 is a light source having an irradiation angle of 60 degrees in the Z direction to the surface (measurement surface) of the recording medium 105. The first photodiode 304 receives the light that has been emitted from the second LED 302 and reflected by the recording medium 105 at an angle of 60 degrees in the Z direction. That is, the angle of the light emission and the angle of the light reception become equal to each other, and the first photodiode 304 forms an optical system that detects a specular reflection component of the light reflected from the recording medium 105.

The third LED 303 is a light source having an irradiation angle of the normal line (90 degrees) to the surface (measurement surface) of the recording medium 105. The second photodiode 305 and the third photodiode 306 each receive light that has been emitted from the third LED 303 and reflected by the recording medium 105. The second photodiode 305 and the third photodiode 306 each measure a distance between the optical sensor 201 and the recording medium 105 based on a light receiving quantity that changes depending on the distance between the optical sensor 201 and the recording medium 105.

Although, in the present exemplary embodiment, the optical sensor 201 is installed in the carriage 101, the installation position is not limited thereto. For example, the optical sensor 201 may be fixed to and installed in the recording apparatus 100. Alternatively, the optical sensor 201 may be a measurement device, separately from the recording apparatus, that measures a diffused reflection characteristic value and a specular reflection characteristic value of the recording medium and then transmits the measured characteristic values to the recording apparatus.

<Block Diagram>

FIG. 4 is a diagram illustrating a block configuration of a control system of the recording apparatus 100. A read only memory (ROM) 402 is a nonvolatile memory and stores, for example, a control program to control the recording apparatus 100 and a program to realize operation according to the present exemplary embodiment. The operation according to the present exemplary embodiment is realized, for example, when a central processing unit (CPU) 401 reads out the program stored in the ROM 402 into a random access memory (RAM) 403, and executes the program. The RAM 403 is also used as a working memory for the CPU 401. An electrically erasable programmable read only memory (EEPROM) 404 stores data to be held even when the power supply of the recording apparatus 100 is turned off. At least the CPU 401 and the ROM 402 realize the function of the information processing apparatus to perform the recording medium determination processing to be described below. Further, the EEPROM 404 stores an extraction range where characteristics of each of the recording media to be used are extracted as a predetermined reference range, and a category of each of the recording media. The category is a large classification of types of recording media. In the present exemplary embodiment, five categories of glossy paper, regular paper, coated paper, film sheet, and special paper are set. For example, in a case where the recording medium is standard glossy paper, the recording medium is classified into the category of the glossy paper. In a case where the recording medium is premium regular paper, the recording medium is classified into the category of the regular paper. Although the recording media include a medium other than a paper medium, a term "sheet" is used for notification to the user in the present exemplary embodiment. The history information and characteristic values of the recording media may be stored in an external memory, such as a ROM of a host computer and a server, instead of a storage medium inside the recording apparatus.

An interface (I/F) circuit 410 connects the recording apparatus 100 and a network such as an external local area network (LAN). The recording apparatus 100 transmits and receives various kinds of jobs, data, etc. to and from an apparatus such as an external host computer via the I/F circuit 410.

The input/output unit 406 includes an input unit and an output unit. The input unit receives an instruction to turn on a power supply, an instruction to perform recording, and an instruction to set various kinds of functions from a user. The output unit displays various kinds of apparatus information such as a power saving mode, and a setting screen for various kinds of functions performable by the recording apparatus 100. In the present exemplary embodiment, the input/output unit 406 is an operation panel provided in the recording apparatus 100. The input/output unit 406 is connected to a system bus 416 via an input/output control circuit 405 such that transmission/reception of data is possible. In the present exemplary embodiment, the CPU 401 controls information notification performed by the output unit.

In addition, the input unit may be a keyboard of the external host computer, and may receive a user instruction from the external host computer. The output unit may be an LED display, a liquid crystal display (LCD) display, or a display connected to the host apparatus. In a case where the input/output unit 406 is a touch panel, a user instruction can be received via software keys. Further, the input/output unit 406 may include a speaker and a microphone, and may receive input from a user by voice and perform notification to the user by voice.

An information processing apparatus that includes a CPU and a ROM having functions similar to the functions of the CPU 401 and the ROM 402 and is externally connected to the recording apparatus 100 may perform recording medium determination processing to be described below to determine the recording medium to be used in the recording apparatus 100.

In a case where the measurement by the optical sensor 201 is performed, an LED control circuit 407 is driven by the CPU 401, and a predetermined LED inside the optical sensor 201 is controlled to emit light. Each of the photodiodes of the optical sensor 201 outputs a signal corresponding to the received light, the signal is converted into a digital signal by an analog-to-digital (A/D) conversion circuit 408, and the digital signal is temporarily stored in the RAM 403. The data to be held even when the power supply of the recording apparatus 100 is turned off is stored in the EEPROM 404.

A recording head control circuit 411 supplies a driving signal corresponding to recording data to a nozzle driving circuit that is mounted on the recording head 102 and includes a selector and a switch, thereby controlling recording operation of the recording head 102, for example, a driving order of the nozzles. For example, in a case where data to be recorded is transmitted from outside to the I/F circuit 410, the data to be recorded is temporarily stored in the RAM 403. The recording head control circuit 411 drives the recording head 102 based on recording data converted from the data to be recorded. At this time, a line feed (LF) motor driving circuit 412 drives an LF motor 413 based on a bandwidth, etc. of the recording data, and the conveyance roller connected to the LF motor 413 is rotated to convey the recording medium. A carriage (CR) motor driving circuit 414 drives the CR motor 415 to cause the carriage 101 to perform scanning via the carriage belt 103.

The data transmitted from the I/F circuit 410 includes not only the data to be recorded but also data of content set by a printer driver. Further, for example, the data to be recorded may be received from outside via the I/F circuit 410 and stored in a storage unit, or may be previously stored in the storage unit such as a hard disk. The CPU 401 reads out image data from the storage unit and controls an image processing circuit 409 to convert the image data into the recording data (binarization processing) for use of the recording head 102. The image processing circuit 409 performs various image processing such as color space conversion, horizontal-vertical (HV) conversion, gamma correction, and rotation of the image, in addition to the binarization processing.

<Measurement Value and Extraction Range>

In the present exemplary embodiment, a diffused reflection value and a specular reflection value are measured as characteristics of the recording medium by the optical sensor 201, and a type of the recording medium to be recorded is determined based on the measurement results and the characteristic extraction range stored in the EEPROM 404. The diffused reflection value corresponds to whiteness of the recording medium, and the specular reflection value corresponds to glossiness of the recording medium.

When values obtained by measuring the characteristics of each of the recording media a plurality of times are mapped in two-dimensional coordinate axes, a diagram of FIG. 5 is obtained. As illustrated in FIG. 5, the measurement values of each of the recording media form a group. The reason why the measurement values are varied is because the measurement values each include a measurement error. The extraction range to be stored in the EEPROM 404 is determined based on the measurement values. The extraction range is a rectangular range in FIG. 5. The rectangular range is an area represented by a rectangle in a two-dimensional space, including the maximum values to the minimum values of the diffused reflection and the specular reflection in the measurement value group of each of the recording media. The extraction range is not limited thereto, and may be represented by other shape or other data group. To determine the type of the recording medium to be recorded, the characteristics of the recording medium to be recorded are measured, and a type of the recording medium having the extraction range including the measurement result is determined as the type of the recording medium to be recorded.

The measurement value of the same recording medium, however, is varied in each apparatus depending on individual difference, minute difference in attachment position, etc. of the optical sensor 201. In a case where the measurement value is out of the extraction range of the type of the recording medium to be recorded previously stored in the EEPROM 404, the apparatus cannot determine the current type of the recording medium to be recorded, which deteriorates determination accuracy of the type of the recording medium.

On the other hand, the positional relationship among the measurement value groups does not depend on the apparatus, and maintains an arrangement similar to the arrangement in FIG. 5. This is because the individual difference and the difference in attachment position of the optical sensor 201 similarly influence on the whole of the measurement values. Therefore, in the present exemplary embodiment, a displacing amount between the measurement values and the extraction range stored in the EEPROM 404 is detected, and the displacement between the measurement values and the extraction range is corrected, and the type of the recording medium is then determined. Accordingly, if the extraction range common to all apparatuses is previously stored, any apparatus can correct the displacement between the measurement values and the extraction range and determine the type of the recording medium. This makes it possible to improve determination accuracy. In the present exemplary embodiment, a correction expression for correcting the measurement values is calculated, and the displacement is corrected by applying the correction expression to the measurement values. In the following, a description will be given of recording medium type determination processing and correction expression calculation processing.

<Recording Medium Type Determination Processing>

FIG. 6 is a flowchart illustrating an example of processing for determining the type of the recording medium 105 to be recorded. Processing in each of steps S501 to S508 in FIG. 6 is realized, for example, when the CPU 401 illustrated in FIG. 4 reads out the program stored in the ROM 402 into the RAM 403, and performs the processing based on the program. Alternatively, the recording medium type determination processing may be performed by software of the host apparatus. In the present exemplary embodiment, since the input/output unit 406 is the operation panel provided in the recording apparatus, candidate types of the recording medium are notified by displaying the names of the types of recording media on the operation panel. The input/output unit 406 may be a display connected to the host apparatus and the host apparatus. In a case where the input/output unit 406 is a speaker having a microphone function that can perform input/output by voice, the candidate types of the recording media are notified by the speaker, and the recording medium is selected in such a manner that the user inputs, by voice, the name of the type of the recording medium or a corresponding code to the microphone.

Upon receiving an instruction to start sheet feeding from the user via the operation panel, i.e., the input/output unit 406, the CPU 401 performs processing to feed the recording medium 105. FIG. 7A illustrates a display example of the operation panel to receive input of the instruction to start the sheet feeding processing. The operation panel is a touch panel that can receive touch input by the user. When the user touches an item "YES", sheet feeding is started.

When the sheet feeding is started, the recording medium 105 is conveyed, by the conveyance roller, to a position on the platen 106 where the optical sensor 201 can detect the recording medium 105. When the recording medium 105 is conveyed, the carriage 101 moves on the recording medium 105 in the X direction, and, in step S501, the optical sensor 201 acquires the diffused reflection value and the specular reflection value of the recording medium 105. The characteristics of the recording medium may be measured at one position, or measurement results obtained at a plurality of positions may be averaged. Further, the characteristics may be measured while the optical sensor 201 is in a stationary state or while the optical sensor 201 moves. The measurement values are temporarily stored in the memory such as the RAM 403.

Next, in step S502, the CPU 401 reads out the acquired measurement values from the memory, and corrects the measurement values by the correction expression. The correction expression calculation processing will be described in detail below.

In step S503, the measurement values corrected in step S502 and the extraction range stored in the EEPROM 404 are compared to extract the type of the recording medium corresponding to the recording medium 105. In this step, CPU 401 functions as an extraction means. Although the type of the recording medium, of which the measurement values are included in the extraction range, is extracted, some of the extraction ranges stored in the EEPROM 404 overlap with the extraction range of the other type of the recording medium as illustrated in FIG. 5. In this case, the measurement values may be included in the extraction ranges of a plurality of types of recording media. In the present exemplary embodiment, in a case where the plurality of types of recording media is extracted, a type of the recording medium having an extraction range, in which the measurement values lie closer to the center value thereof, is extracted.

In step S504, it is determined whether the type of the recording medium extracted in step S503 is present. In a case where the extracted type of the recording medium is present (YES in step S504), the processing proceeds to step S505. In step S505, as illustrated in FIG. 7D, the extracted type of the recording medium is displayed as the type of the recording medium to be recorded on the input/output unit 406, and the extracted type of the recording medium is stored in the ROM 402. The processing is then ended. In a case where the user wants to change the type of the recording medium (standard regular paper in FIG. 7D) displayed on the input/output unit 406, the user selects an item "standard regular paper" to change the screen to a category screen in FIG. 7B, and the user can select the desired type of the recording medium. In a case where the user selects the type of the recording medium different from the type of the recording medium displayed in step S505, the type of the recording medium stored in the ROM 402 is updated.

Figure 7B:
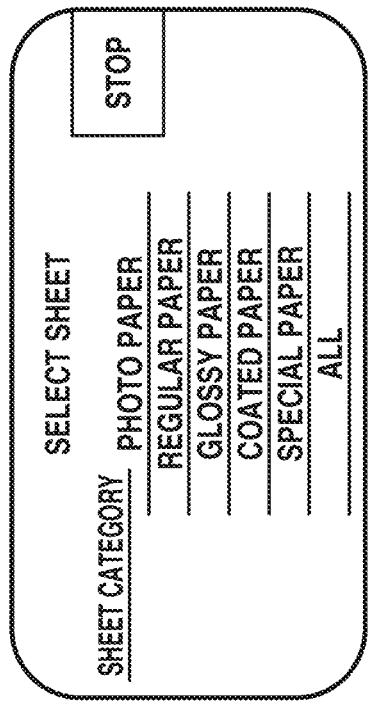
FIG. 7B is a diagram illustrating a display form of the input/output unit according to the first exemplary embodiment.
Figure 7D:
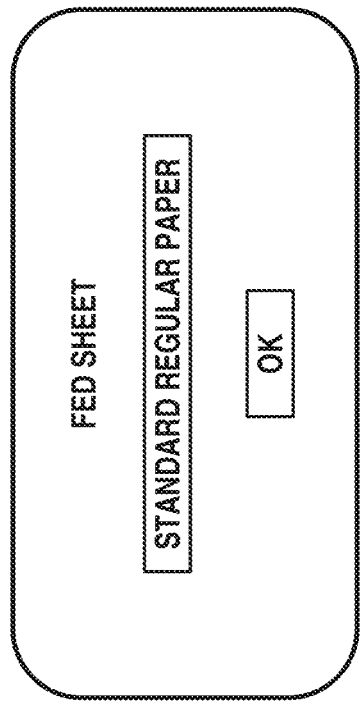
FIG. 7D is a diagram illustrating a display form of the input/output unit according to the first exemplary embodiment.
Figure 7A:
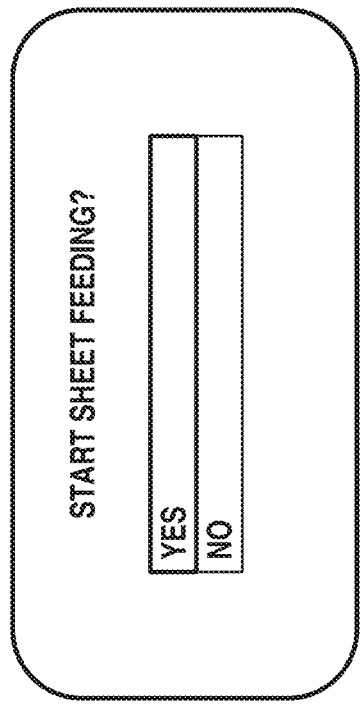
FIG. 7A is a diagram illustrating a display form of an input/output unit according to the first exemplary embodiment.
Figure 7C:
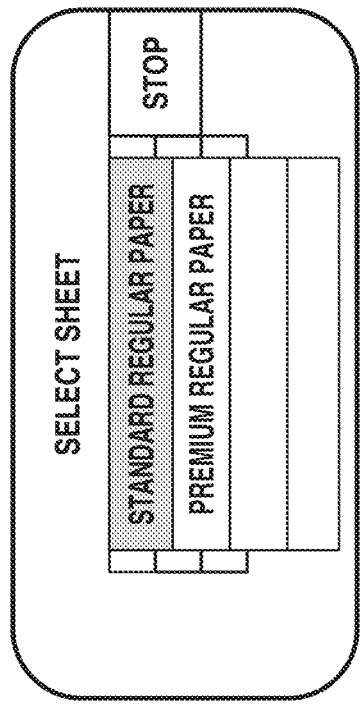
FIG. 7C is a diagram illustrating a display form of the input/output unit according to the first exemplary embodiment.

In a case where the extracted type of the recording medium is not present in step S504 (NO in step S504), then in step S506, an item "all" for displaying all categories and all sheet types at a time is displayed on the operation panel as illustrated in FIG. 7B. The categories are arranged in a predetermined order and displayed. In a case where the categories are displayed, the types of recording media in the category are displayed as illustrated in FIG. 7C in response to selection of the category by the user. In this example, the regular paper is selected by the user. Further, input of the type of the recording medium selected from the displayed types of recording media is received. The input is performed by touching the item displaying the name of the recording medium. In FIG. 7B, the item "all" is displayed at the bottom of the screen in addition to the categories of the recording media. When the item "all" is selected, all of the recording media are displayed in the predetermined order. The recording media may be displayed in order of the latest to oldest types used from the most recently or the last used one.

In a case where the user selects the type of the recording medium using the input/output unit 406 in step S507 (YES in step S507), the processing proceeds to step S508.

In step S508, as illustrated in FIG. 7D, the type of the recording medium selected by the user is displayed as the type of the recording medium to be recorded on the input/ output unit 406, and the selected type of the recording medium is stored in the ROM 402. The processing is then ended.

The type of the fed recording medium 105 is determined in the above-described manner. In the processing of the flowchart in FIG. 6, one type of the recording medium is extracted in step S503. In a case where the plurality of types of recording media is extracted, the plurality of extracted types of recording media may be displayed on the input/output unit 406 to cause the user to select on therefrom.

<Correction Expression Calculation Processing>

Next, the processing for calculating the correction expression correcting the measurement values in step S502 of FIG. 6 will be described. FIG. 8 is a flowchart illustrating the correction expression calculation processing. In the correction expression calculation processing, the characteristics of the recording medium are measured, the measurement values and the extraction range as illustrated in FIG. 5 are compared, and the correction expression for correcting the measurement values is obtained. This processing is realized, for example, when the CPU 401 illustrated in FIG. 4 reads out the program stored in the ROM 402 into the RAM 403 and executes the program. Alternatively, the correction expression calculation processing may be executed by software of the host apparatus.

The correction expression calculation processing is started when the user selects an item "automatic determination correction" on the input/output unit 406. The item "automatic determination correction" is displayed in the following manner.

Figure 9A:
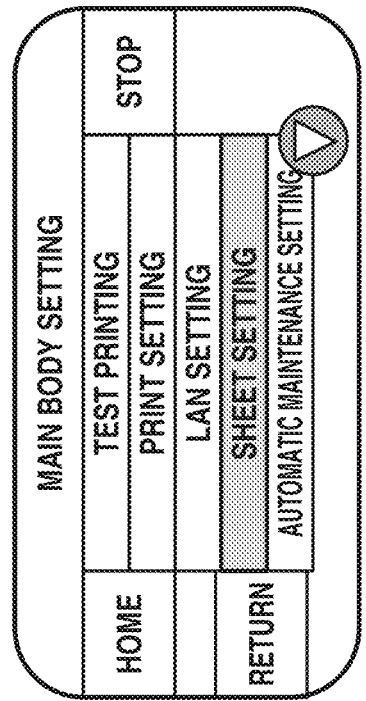
FIG. 9A is a diagram illustrating a display form of the input/output unit according to the first exemplary embodiment.
Figure 9B:
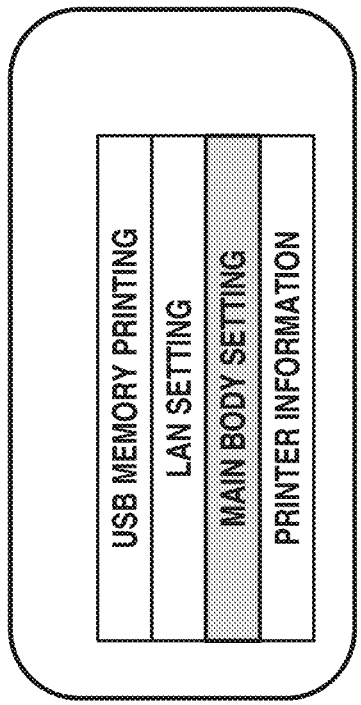
FIG. 9B is a diagram illustrating a display form of the input/output unit according to the first exemplary embodiment.
Figure 9C:
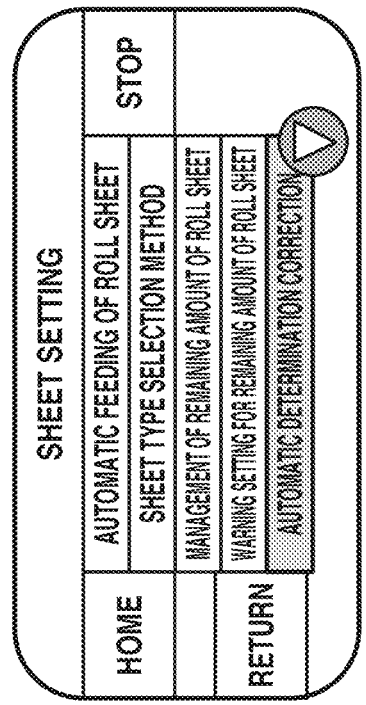
FIG. 9C is a diagram illustrating a display form of the input/output unit according to the first exemplary embodiment.

First, a home screen (FIG. 9A) is displayed on the input/output unit 406. FIG. 9A illustrates a state where, among items displayed on the home screen, an item "main body setting" is selected. When an item is selected, the selected item is highlighted, and a next screen is displayed. In FIGS. 9A to 9C, the selected items are highlighted by a different background color and a thicker frame than the other items.

When the item "main body setting" is selected on the home screen, a main body setting screen as illustrated in FIG. 9B is displayed on the input/output unit 406. When an item "sheet setting" is selected on the main body setting screen, the item "sheet setting" is highlighted as illustrated in FIG. 9B, and a sheet setting screen as illustrated in FIG. 9C is displayed. When the item "automatic determination correction" is selected in FIG. 9C, the correction expression calculation processing is started.

When the correction expression calculation processing is started, the sheet feeding is performed to convey the recording medium 105 to the position where the optical sensor 201 can detect the recording medium 105 on the platen 106. In a case where the sheet feeding has been already completed, the sheet feeding processing is not performed.

When the recording medium 105 is placed on the platen 106, in step S801, the categories and the item "all" are displayed on the input/output unit 406 as illustrated in FIG. 7B.

Next, in step S802, the user selects the type of the recording medium on the input/output unit 406 (YES in step S802), the processing proceeds to step S803. Here, a case where "backlight film HG" is selected will be described as an example.

In step S803, the optical sensor 201 measures the plurality of diffused reflection values and the plurality of specular reflection values as the characteristics of the recording medium 105, and CPU 401 temporarily stores these values in the RAM 403. In this step, CPU 401 functions as an acquisition unit. In the present exemplary embodiment, 100 points on the recording medium 105 are measured to acquire the measurement values. The 100 points are points at different positions on the recording medium 105.

In step S804, the extraction range of the type of the recording medium selected in step S802 is acquired from the EEPROM 404.

Figure 10:
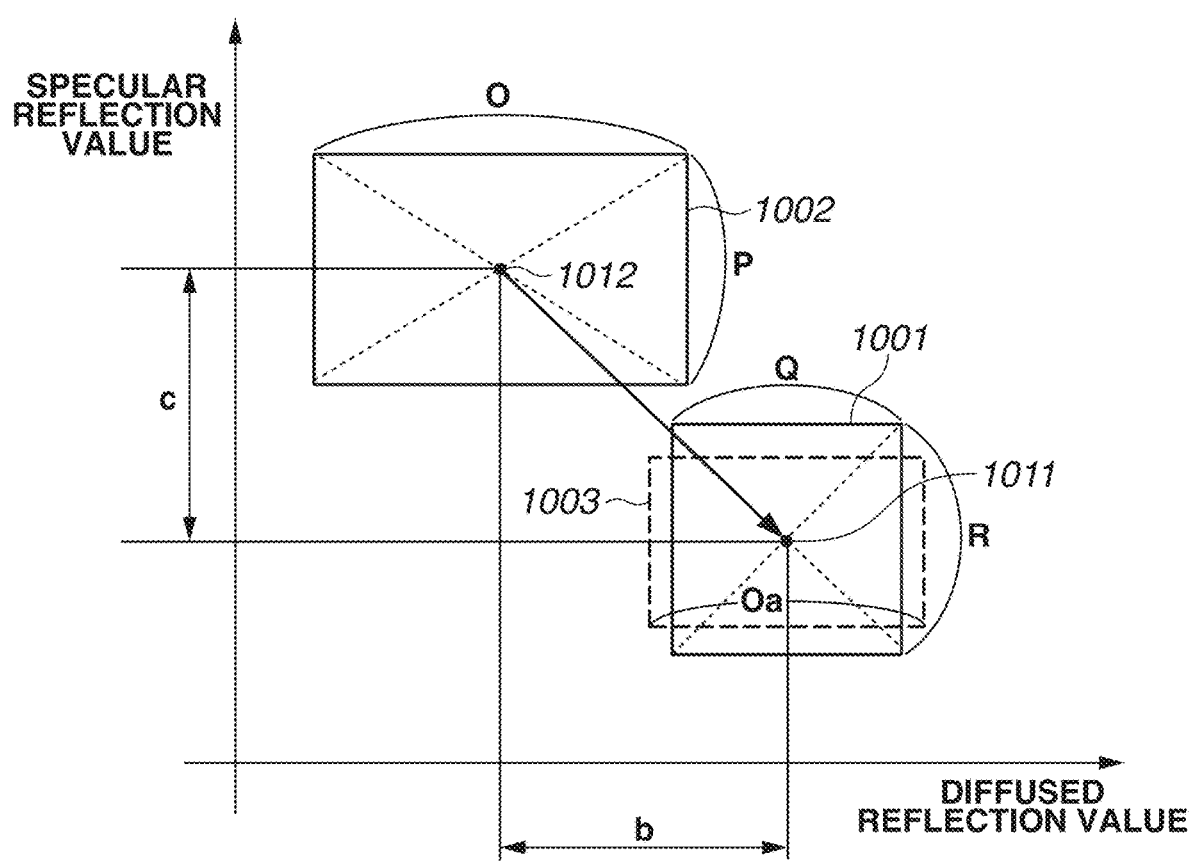
FIG. 10 is a diagram illustrating the correction expression calculation processing according to the first exemplary embodiment.

Subsequently, in step S805, the correction expression is calculated. Specifically, the measurement values acquired in step S803 and the extraction range acquired in step S804 are compared. The comparison in the present exemplary embodiment is realized by performing overlapping processing of an extraction range of a specific recording medium. FIG. 10 is a diagram illustrating the processing of overlapping the extraction range of the backlight film HG illustrated in FIG. 5 with the measurement values. A rectangle 1001 indicates an extraction range stored in the EEPROM 404. A rectangle 1002 is a rectangle calculated from the plurality of measurement values measured in step S803, and is defined by the maximum value and the minimum value among the plurality of measurement values read out from the RAM 403. In other words, the upper-left coordinates of the rectangle 1002 are given as (minimum value of diffused reflection, maximum value of specular reflection), and the lower-right coordinates are given as (maximum value of diffused reflection, minimum value of specular reflection). In the similar manner, a value at the lower-left coordinates (minimum value of diffused reflection, minimum value of specular reflection), and a value at the upper-right coordinates (maximum value of diffused reflection, maximum value of specular reflection) are also obtained. Since the rectangle 1001 and the rectangle 1002 each represent a range of the same type of the recording medium, the two rectangles are set to largely overlap with each other, so that it is possible to improve determination accuracy of the type of the recording medium extracted from the measurement values. In the present exemplary embodiment, to cause the two rectangles to largely overlap with each other, translation and scaling of the rectangle 1002 of the measurement values are performed, and an amount of the translation and a scaling factor are calculated as the correction expression for correcting displacement of the measurement values with respect to the extraction range stored in the EEPROM 404. In FIG. 10, a rectangle 1003 is a rectangle obtained by performing the translation and the scaling of the rectangle 1002. In the present exemplary embodiment, the translation and the scaling are performed; however, only the translation may be performed.

First, a method of calculating the amount of translation will be described. A difference between a center point 1011 of the rectangle 1001 and a center point 1012 of the rectangle 1002 is calculated as the amount of translation. The calculation is one-dimensionally performed along each of the axes. For example, the amount of translation on a diffused reflection axis corresponds to an amount b in FIG. 10.

Next, a method of calculating the scaling factor will be described. In the present exemplary embodiment, the scaling is performed while an aspect ratio of the rectangle 1002 is maintained. A scaling factor a of the rectangle 1002 is calculated by the following expression.

$$a = (Q+R)/(O+P)$$

O: a length of the rectangle 1002 in a lateral direction
P: a length of the rectangle 1002 in a vertical direction
Q: a length of the rectangle 1001 in the lateral direction
R: a length of the rectangle 1001 in the vertical direction For example, in a case where the length O of the rectangle 1002 in the lateral direction is 1, the scaling factor of the diffused reflection can be obtained by a length Oa of the rectangle 1003 in the lateral direction.

Accordingly, the correction expression for correcting the measurement values is summarized as follows.

$$y1 = a\,x1 + b \quad (1)$$

y1: the diffused reflection value of the measurement values after the correction
a: the scaling factor of the rectangle
x1: the diffused reflection value obtained by actual measurement
b: the amount of translation In the similar manner, the amount of translation on the specular reflection axis corresponds to an amount c in FIG. 10. Therefore, the correction expression of the measurement values is obtained as follows.

$$y2 = a\,x2 + c \quad (2)$$

y2: the specular reflection value of the measurement value after the correction
a: the scaling factor of the rectangle
x2: the specular reflection value obtained by actual measurement
c: the amount of translation Note that the scaling factor a in each of the expression (1) and the expression (2) can be accurate when a distance from a position of the diffused reflection value x1 and a position of the specular reflection value x2 on the coordinates to a centroid of the corresponding rectangle where each position belongs to are considered; however, an approximated value is used in the present exemplary embodiment. This is because the amount of translation can contribute largely to the overlapping of the rectangles as compared with the scaling factor.

In other words, as illustrated in FIG. 10, the coordinates inside the rectangle 1001 are all positioned outside the rectangle 1002, and the overlapping amount of the rectangles is largely increased by the translation to obtain the overlapping of the centroids.

In a case where the apparatus is different, i.e., in a case where the recording apparatus is different in the present exemplary embodiment, there are the number of factors, including the measurement condition, that influence the measurement values, and the influence is large. In FIG. 10, the rectangle 1002 is not overlapped with the rectangle 1001 even partially. The distance between the rectangle 1002 and the rectangle 1001 can be regarded as difference between the recording apparatus performing measurement and an ideal recording apparatus, and the correction amount by the translation contributes to eliminate the difference.

In contrast, the scaling factor a is about 80% to about 120% in percentage, and the correction amount of the measurement value by the scaling factor a is considerably smaller than the correction amount by the translation. The size of the rectangle 1002 is influenced by variation of the measurement values. In the plurality of times of measurement, the measurement is performed under the same condition except different measurement positions on the recording medium, and the measurement values by the plurality of times of measurement tend to be concentrated in a close range.

In the present exemplary embodiment, as an example of the difference in the measurement value between the different apparatuses, the correction value of the specular reflection value in FIG. 5 may vary by about ±100. In contrast, the correction value of the specular reflection value in a case where the extraction range and the range of the measurement value group are corrected by the scaling factor is up to about ±10. As described above, in the present exemplary embodiment, the amount of translation is more dominant with respect to the overlapping than the scaling factor, and even the correction expression calculated through the above-described approximation is also usable. The correction expression using the scaling factor for which the centroid of the rectangle is considered is also usable.

In this example, the comparison is performed by using the rectangles illustrated in FIG. 10; however, the other method can be also used as long as the method compares the overlapping degrees of the measurement value groups. For example, in a case where the measurement values are distributed in a circular shape, the extraction range may be set in a circular shape, and the circle of the measurement values and the circle of the extraction range may be compared to calculate the correction expression.

Further, in the present exemplary embodiment, the rectangle 1003 is used only for calculation of the correction expression, and the extraction range used in the recording medium extraction processing in step S503 in the recording medium type determination processing in FIG. 6 is the rectangle 1001 that is the extraction range previously stored in the EEPROM 404. However, this is not limitative. When the correction expression calculation processing is performed, the extraction range used in step S503 may be updated with the rectangle 1003, and the rectangle 1003 may be stored in the EEPROM 404.

In step S806, the correction expression calculated in step S805 is stored in the EEPROM 404. In steps S805 and S806, CPU 401 functions as a setting unit. The above-described correction expression can be calculated from at least one type of a recording medium. Even in a case of a type of a recording medium not supplied to the recording apparatus before, applying the calculated correction expression makes it possible to improve the extraction accuracy as compared with a case where the correction expression is not applied. To perform determination with higher accuracy, however, it is desirable to calculate the correction expression for each of three or more types of recording media. In this case, the above-described overlapping processing is performed on each of the types of recording media, and obtained results are averaged. For example, in a case where the correction expression is calculated for each of three types of recording media 1 to 3, the obtained calculation results are expressed by the following three expressions.

$$y = a1x + b1$$

$$y = a2x + b2$$

$$y = a3x + b3$$

A final correction expression calculated by averaging the three results obtained based on the three expressions is as follows.

$$y = ((a1 + a2 + a3)/3)x + (b1 + b2 + b3)/3$$

The processing in FIG. 8 is thus ended. The correction expression is updated every time the processing is performed.

In the present exemplary embodiment, the correction expression calculation processing in FIG. 8 is started when the user selects an item on the home screen. Alternatively, for example, the item may be configured to be selectable when the sheet feeding is started. Further, the correction expression calculation processing may be automatically performed when sheet feeding is performed for the first time in the recording apparatus, or the correction expression calculation processing may be performed in a case where the recording medium is fed for the first time in the processing in FIG. 6.

As described above, if the extraction range common to all apparatuses is previously stored and displacement between measurement values and the extraction range is corrected, displacement specific to each apparatus can be corrected, and the type of the recording medium can be determined. This makes it possible to improve the determination accuracy.

Second Exemplary Embodiment

In the first exemplary embodiment, the displacement between the measurement values and the extraction range is corrected by the correction expression for correcting the measurement values. In a second exemplary embodiment, the displacement between the measurement values and the extraction range is corrected by correcting the extraction range. Descriptions of parts similar to the parts in the first exemplary embodiment will be omitted.

The correction of the extraction range will be described. To change the extraction range based on the displacing amount, the translation and the scaling of the rectangle 1001 in FIG. 10 are performed such that the rectangle 1001 is largely overlapped with the rectangle 1002, and the extraction range stored in the EEPROM 404 is updated. The extraction range at this time is determined by the following expression. The scaling factor a and the amount of translation b are respectively the same as the scaling factor a and the amount of translation b described with reference to FIG. 10 in the first exemplary embodiment.

$$u = \left(\frac{1}{a}\right)t - b$$

u: a value of the extraction range before conversion
a: the scaling factor of the rectangle
t: a value of the extraction range after the conversion
b: the amount of translation A value at each of four corners of the extraction range after the conversion is obtained by substituting a value at each of the four corners of the extraction range before the conversion for tin the expression. The extraction range stored in the EEPROM 404 is updated with the obtained value. The update is performed on all of the extraction ranges stored in the EEPROM 404.

In the present exemplary embodiment, the recording medium type determination processing is performed after the extraction ranges stored in the EEPROM 404 is updated. Therefore, the processing in step S502 of FIG. 6 according to the first exemplary embodiment is not performed, and the recording medium type determination processing is performed by performing the processing in steps S501 and S503 to S508.

Correcting the extraction range in the above-described manner also makes it possible to correct the displacement between the measurement values and the extraction range.

Third Exemplary Embodiment

In the above-described exemplary embodiments, all of the types of recording media, the extraction ranges of which are previously stored in the EEPROM 404, are determination targets in the recording medium type determination processing. However, some of the recording media may not be used by the user. In a case where the extraction range of an unused recording medium and the extraction range of a used recording medium are close to each other, the unused recording medium may be extracted in the recording medium type determination processing. In the third exemplary embodiment, among the recording media of which the extraction ranges are previously stored in the EEPROM 404, a recording medium often used by the user can be selected and set as the determination target in the recording medium type determination processing. Descriptions of parts similar to the parts in the first exemplary embodiment are omitted.

Figure 11:
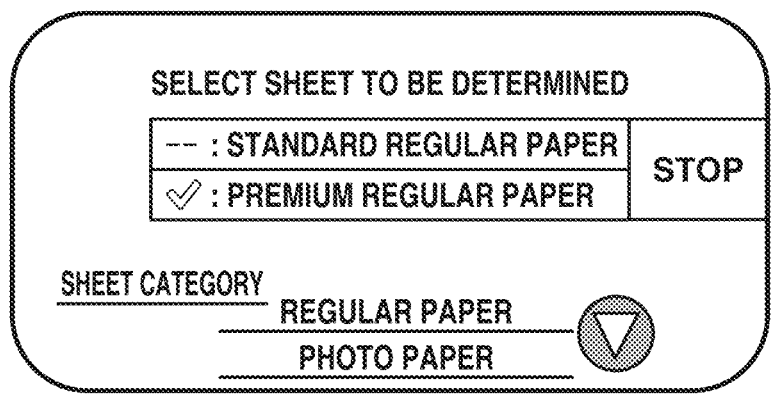
FIG. 11 is a diagram illustrating a display form of an input/output unit according to a third exemplary embodiment.

FIG. 11 illustrates a display example of the input/output unit 406 for switching the recording medium to be determined, i.e., determination target. For each of the types of recording media, it can be selected whether the type of a recording medium is set as a determination target. The selection can be switched by touching the item of the type of a recording medium to be switched. In FIG. 11, the item of the recording medium to be determined is marked with a check mark, and the item of the recording medium not to be determined is marked with "__".

In step S503 in the recording medium type determination processing in FIG. 6, the extraction ranges of the types of recording media set as the determination targets and the values obtained by converting the measurement values by the correction expression are compared to extract the type of the recording medium. In steps S501, S502, and S504 to S508, processing similar to the processing described in the first exemplary embodiment is performed.

The same correction expression is used even after the recording medium to be determined is switched.

As described above, selecting the type of a recording medium to be determined in the recording medium type determination processing increases the possibility that the type of a recording medium that the user wants to select is extracted.

Other Exemplary Embodiments

In the above-described exemplary embodiments, a specular reflection value and a diffused reflection value are acquired as characteristics, and the type of a recording medium is extracted based on the acquired measurement values. Characteristics to be acquired, however, are not limited thereto. For example, the recording apparatus may include a sensor for measuring a thickness of the recording medium, and may acquire the thickness of the recording medium as a characteristic. In addition, the number of characteristics to be acquired is not limited to two. Increasing the number of acquired characteristics facilitates determination of the types of recording media having close two-dimensional characteristics, which makes it possible to further improve the determination accuracy.

According to the above-described exemplary embodiments, it is possible to determine the type of a recording medium with high accuracy.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments.

This application claims the benefit of Japanese Patent Application No. 2020-026533, filed Feb. 19, 2020, which is hereby incorporated by reference herein in its entirety.

What is claimed is:

1. An information processing apparatus, comprising:
one or more processor and one or more memory coupled to each other and to perform operations including:
storing extraction ranges set to respective types of recording media, wherein the extraction ranges are configured to be used to determine a type of a recording medium,
acquiring a plurality of measurement results obtained by measuring, a plurality of times, a characteristic of a recording medium set to be measurable and to be recorded,
inputting information corresponding to a type of the recording medium or which the plurality of measurement results were acquired, wherein the type of the recording medium indicated by the input information is associated with an extraction range from the stored extraction ranges,
setting a parameter to correct the acquired plurality of measurement results, wherein, based on the acquired plurality of measurement results and the input information corresponding to the type of the recording medium, the parameter is set such that a difference between the plurality of measurement results and the extraction range of the type of the recording medium indicated by the input information is reduced,
correcting an acquired measurement result obtained by measuring by using the set parameter, and
extracting a candidate type of the recording medium based on the corrected measurement result and the associated extraction range.

2. The information processing apparatus according to claim 1,
wherein setting includes setting a parameter of a correction expression for correcting the acquired measurement result, and
wherein extracting includes extracting the candidate type of the recording medium, the measurement result of which are acquired based on the measurement result corrected by the correction expression set with the parameter and the extraction range.

3. The information processing apparatus according to claim 1, wherein setting includes setting the parameter based on a moving amount and a scaling factor in a case where translation and scaling are performed to cause a range based on the plurality of measurement results to be overlapped with the extraction range.

4. The information processing apparatus according to claim 1, wherein the operations further include controlling to notify the extracted type of the recording medium.

5. The information processing apparatus according to claim 1, wherein inputting includes inputting information corresponding to the extracted type of the recording medium as the information corresponding to the type of the recording medium, the plurality of measurement results of which are acquired.

6. The information processing apparatus according to claim 4, wherein the operations further include selecting an extractable type of a recording medium.

7. The information processing apparatus according to claim 1, wherein the operations further include:
conveying the recording medium to a position where recording is performed, and
applying a recording material to the conveyed recording medium.

8. The information processing apparatus according to claim 7, wherein measuring includes measuring a characteristic of the recording medium conveyed to a position where measurement is performable.

9. The information processing apparatus according to claim 1,
wherein measuring the characteristic of the recording medium includes acquiring a diffused reflection characteristic value and a specular reflection characteristic value on a surface of the recording medium, and
wherein values of the measured characteristics of the recording medium each include a measurement error such that the values of the measured characteristics are varied.

10. The information processing apparatus according to claim 1, wherein the operations further include determining the type of the recording medium to be recorded based on whether a type of the recording medium has the extraction range including the plurality of measurement results.

11. The information processing apparatus according to claim 1, wherein the difference between the plurality of measurement results and the extraction range of the type of the recording medium indicated by the input information is realized by performing overlapping processing of an extraction range of a specific recording medium.

12. A method for an information processing apparatus, the method comprising:
storing extraction ranges set to respective types of recording media, wherein the extraction ranges are configured to be used to determine a type of a recording medium;
acquiring a plurality of measurement results obtained by measuring, a plurality of times, a characteristic of a recording medium set to be measurable and to be recorded;
inputting information corresponding to a type of the recording medium for which the plurality of measurement results were acquired, wherein the type of the recording medium indicated by the input information, is associated with an extraction range from the stored extraction ranges;

setting a parameter to correct the acquired plurality of measurement results, wherein, based on the acquired plurality of measurement results and the input information corresponding to the type of the recording medium, the parameter is set such that a difference between the plurality of measurement results and the extraction range of the type of the recording medium indicated by the input information is reduced;

correcting an acquired measurement result obtained by measuring by using the set parameter; and extracting a candidate type of the recording medium based on the corrected measurement result and the associated extraction range.

* * * * *